No. 794,335. PATENTED JULY 11, 1905.
J. W. BAUMAN.
STEAM COOKER.
APPLICATION FILED NOV. 10, 1904.
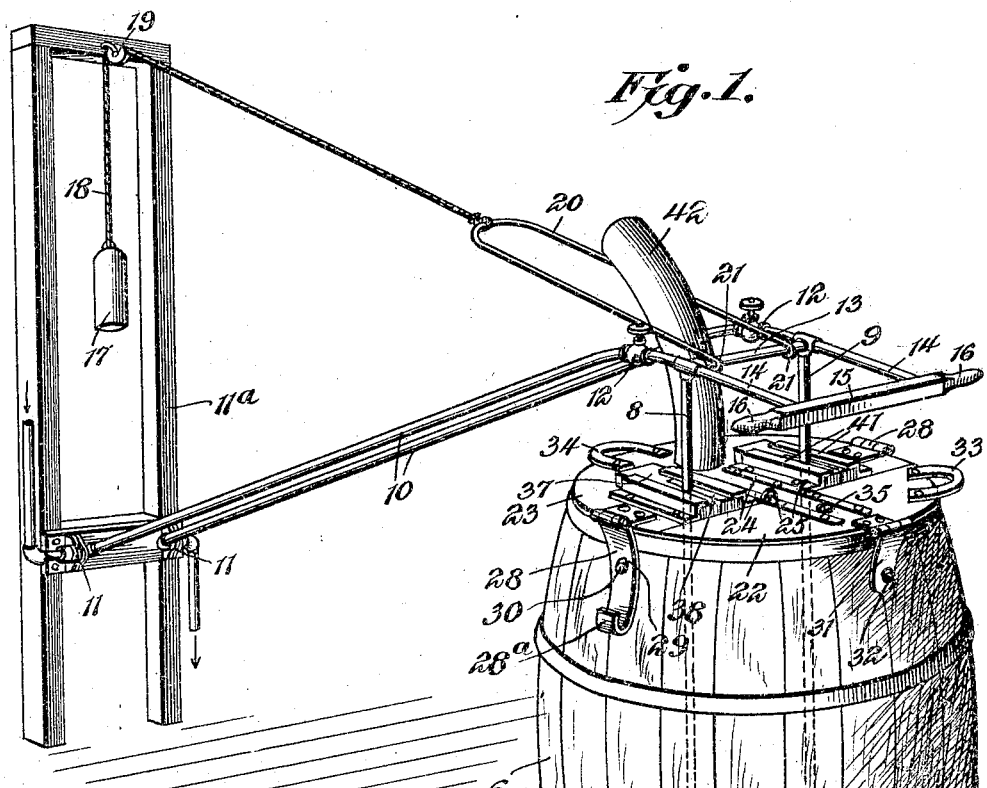
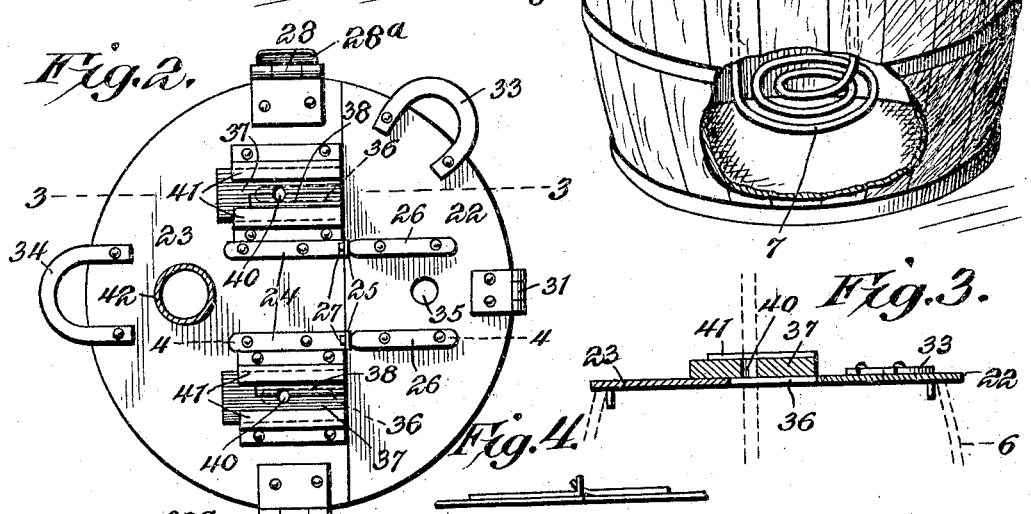
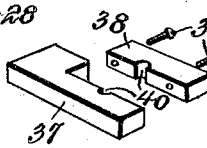
Witnesses
Howard D. Orr
B. G. Foster
John W. Bauman, Inventor,
By E. G. Siggers
Attorney No. 794,335. Patented July 11, 1905.

UNITED STATES PATENT OFFICE.

JOHN W. BAUMAN, OF SASSAMANSVILLE, PENNSYLVANIA.

STEAM-COOKER.

SPECIFICATION forming part of Letters Patent No. 794,335, dated July 11, 1905.

Application filed November 10, 1904. Serial No. 232,170.

*To all whom it may concern:*

Be it known that I, JOHN W. BAUMAN, a citizen of the United States, residing at Sassamansville, in the county of Montgomery and State of Pennsylvania, have invented a new and useful Steam-Cooker, of which the following is a specification.

This invention has particular reference to means for cooking apple-butter, though not necessarily limited to this use.

One of the objects is to provide a novel and simple cover which can be applied to an ordinary barrel or other receptacle, will permit the ready introduction of the heater thereinto and the operation of said heater will, furthermore, permit the examination and proper care of the contents of the receptacle while being cooked and will effectually prevent the boiling over of said contents and the escape of the steam in the vicinity of the operator, thereby avoiding the burning and scalding of such operator.

The preferred embodiment of the invention is illustrated in the accompanying drawings and is described in the following specification; but that the invention is not limited to the structure shown and described will be evident by an inspection of the claims hereto appended.

In the drawings, Figure 1 is a perspective view of the cooker. Fig. 2 is a top plan view of the cover, the steam-escape tube being shown in section. Fig. 3 is a sectional view taken on the line 3 3 of Fig. 2. Fig. 4 is a sectional view taken on the line 4 4 of Fig. 2. Fig. 5 is a detail perspective view of one of the closures, showing the sections thereof detached.

Similar reference-numerals designate corresponding parts in all the figures of the drawings.

In the embodiment illustrated a receptacle 6 is employed, which may be an ordinary barrel, and within this receptacle is adapted to be placed a heater comprising a substantially horizontal coil 7, carried by the lower ends of depending supply and exhaust heater-pipes 8 and 9, said pipes being connected to other pipes 10, hinged, as shown at 11, to a suitable upright supporting-frame 11$^a$. The supply and exhaust of the steam or other heating medium is controlled by valves 12, located in the pipes 10, and said pipes are connected at their junctures with the pipes 8 and 9 to a cross-bar 13. The pipes 10 are provided with extensions 14, projecting beyond the pipes 8 and 9 and connected to a cross handle-bar 15, having suitable grips 16, this handle-bar being disposed above one side of the barrel. The weight of the heater is counteracted to a considerable extent by a counterbalancing-weight 17, attached to a cable 18, that passes over a pulley 19 at the top of the frame 11$^a$, said cable being connected to a substantially U-shaped bail 20, having terminal hooks 21, that detachably engage about the cross-bar 13.

A cover for the receptacle is employed consisting of a front section 22 and a rear section 23, said sections having coacting edges and being detachably connected by spaced hinges. The hinges comprise eye members 24, secured to one of the sections and having upstanding eyes 25, and hook members 26, secured to the other section and having upstanding hooks 27, that pivotally and detachably engage in the eyes 25. The sections may be constructed of any material desired and preferably together form a circular cover which is adapted to rest snugly upon the upper edge of the receptacle. The rear section 23 is provided with means for securing the same against movement to the receptacle, said means in the present instance comprising hinge-ears 28, located at diametrically opposite sides of the cover and having openings 29, that receive pins 30, projecting from the corresponding sides of the receptacle. These ears 28 also constitute means for securing the cover to the heater. It will be observed that the said ears are provided with terminal-hooks 28$^a$, and these are adapted to engage over the extensions 14 when the ears are released from the receptacle and thrown upwardly. The front section 22 is arranged to swing with respect to the rear section and has a suitable retaining-hasp 31, adapted to engage a holding-pin 32 on the receptacle, said front section being provided with a suitable handle 33 and the rear section also having a handle 34. A filling-opening 35 is formed in the front section and is adapted to receive an ordinary funnel.

The rear section 23 is provided with passage-ways that receive the depending pipes 8 and 9, said passage-ways being in the form of slots 36 extending into the same from its front edge, and said slots permitting the lateral movement of the pipes 8 and 9 and being covered by sliding closure-plates consisting of sections 37 and 38, detachably secured together in any suitable manner—as, for instance, by screws 39—said plates being arranged to respectively embrace the pipes and having openings 40 therethrough, located partially in each section. The closure-plates are slidably mounted in guideways, formed on opposite sides of the slots by overhanging flanges 41, secured to the rear section 23.

For the purpose of permitting the escape of steam and vapor from the cooking contents a tube 42 is employed that is carried by the cover-section 23 and communicates with the interior of the vessel. This tube is arranged in an upstanding position, is located between the arms of the bail 20, and is curved rearwardly so that its nozzle is turned away from the front section 22 of the cover.

With this structure it will be observed that the weight of the counterbalance is equally distributed by means of the bail 20, thereby avoiding considerable side friction and permitting the easy manipulation of the heater. It will also be clear that the heater may be readily inserted into the receptacle by first attaching the closure-plates to the pipes 8 and 9, the openings 40 through said plates being of sufficient size to permit the vertical movement of the pipes. The front section having been detached from the rear section of the cover, the said plates may be readily slipped into position over the slots when the heater-coil is introduced into the receptacle, and after the said front section has been again hinged to the rear section and the cover closed it will be apparent that the same completely closes the top of the receptacle, as the opening 35 can be stopped by a bung or other similar device.

In using the apparatus the coil is placed upon the bottom of the receptacle, and the apples or other articles to be cooked, together with the ingredients used in connection therewith, are placed in said receptacle, the section 22 either being swung back or detached for that purpose. Steam is then introduced into the coil through the pipe 8, and the escape of the same and the condensed water is effected through the pipe 9. During the cooking operation the coil may be moved up and down by means of the handle 15, thereby acting as an agitator to thoroughly stir the contents and to secure the proper heating of the same. Material may be added from time to time through the opening 35, and the escape of the steam from the cooking product is permitted through the tube 42 away from the operator. When the material has been thoroughly treated, the cover can be raised and the coil removed from the receptacle and applied to another barrel, or the contents may be removed and the same receptacle used again. To do this, it is only necessary to hook the ears 28 upon the extensions 14, whereupon by raising the handles the cover is also raised without the necessity of touching it. With this structure various operations can be performed with the greatest convenience, and there is little liability of the operator becoming scalded from the escape of steam or the overflow of the boiling or highly-heated product.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. A cover for steam-cookers comprising hinged sections, said cover having a heater-pipe passage therethrough that is located contiguous to and opens at the joints of the sections, in combination with a heater having a pipe that slidably passes through the passage and is detachable through the open side thereof.

2. A cover for steam-cookers comprising sections having adjacent margins, and detachable hinges connecting the sections, one of said sections having a heater-pipe-receiving opening therethrough in the margin that is contiguous to the other section, and opening at the adjacent edge, and a heater having a pipe passed through the opening.

3. A cover for steam-cookers comprising sections having coacting edges, one of said sections being provided with a heater-pipe-receiving opening extending into the same from its coacting edge and thereby having an open end, the adjacent portion of the other section closing the end of such opening, and hinges connecting the sections, said hinges comprising eye members carried by one section and hook members carried by the other section and detachably interlocked in the eye members.

4. In a steam-cooker, the combination with a receptacle, of a cover for the receptacle comprising sections, hinges detachably connecting the sections, one of said sections having an opening therethrough located contiguous to the other section and having an open side closed by said other section, and a heater comprising a coil located within the receptacle and a heater-pipe connected to the coil and passing through the opening.

5. A cover for steam-cookers having an opening therethrough, in combination with a heater including a pipe slidably passing through the opening, and a closure for the opening movably mounted on the cover and having the pipe slidably passing therethrough.

6. In a steam-cooker, the combination with a receptacle, of a cover for the same comprising sections detachably hinged together, one of said sections having a slot extending from the hingedly-connected margin thereof, a heater movably located in the receptacle and including a pipe passing through the slot, and a closure for said slot slidably mounted on the cover and having an opening through which the pipe slidably passes.

7. A cover for steam-cookers having a heating-pipe-receiving passage-way therethrough, and a closure for said passage-way comprising detachably-connected sections arranged to embrace the pipe.

8. A cover for steam-cookers having a slot to receive a heater-pipe, and guideways located on opposite sides of the slot, and a closure-plate for the slot slidably mounted in the guideways and comprising sections detachably secured together, said plate having an opening therethrough that is located partially in each section.

9. In a cover for steam-cookers, the combination with relatively movable sections having abutting edges, one of said sections having a slot extending from its said abutted edge, of a movable closure for said slot mounted on the section having the same and provided with a heater-pipe-receiving opening, and means for securing the cover upon the receptacle.

10. In a cover for steam-cookers, the combination with sections having adjacent margins, one of which has a slot located in its margin, of detachable hinge connections between the adjacent margins of the sections, the end of the slot being open when the sections are detached, and a closure for said slot slidably mounted on the section having the same, said closure being provided with an opening that is adapted to receive a heater-pipe.

11. In a cover for steam-cookers, the combination with sections, one of which is provided with spaced slots extending from one edge, and guideways located on opposite sides of the slots, of means for connecting said section to a receptacle, detachable hinge connections between the sections, and closures for the slots comprising plates that are slidably mounted in the guideways, said plates consisting of sections detachably secured together and provided with openings alined with the slots.

12. In a cover for steam-cookers, the combination with sections hinged together and arranged to be detachably placed upon a receptacle, of means carried by one of the sections for securing the same against movement upon the receptacle, the other sections having a swinging movement with respect to the stationary section, a heater located in the receptacle, and an upstanding steam-escape tube carried by the stationary section and having its outer free end turned rearwardly away from the hinge-section, forming a rearwardly-discharging nozzle.

13. In a steam-cooker, the combination with a receptacle, of a cover located thereon and comprising a stationary section and a swinging section, detachable hinge connections between the sections, said stationary section being provided with slots and guideways located on opposite sides of the slots, closures for the slots slidably mounted in the guideways and having openings therethrough, said closures consisting of sections, a heater including a supply and exhaust pipe respectively passing through the closures, and a rearwardly-curved escape-tube carried by the stationary section and turned away from the swinging section.

14. In a steam-cooker, the combination with a receptacle having a cover, of a steam-heater movable in an upward and downward direction and having portions passing through the cover, and a counterbalance for the heater having a detachable connection therewith.

15. In a steam-cooker, the combination with a receptacle, of a heater including spaced elements slidably mounted in the cover, a cross-bar connecting the elements, a counterbalance, and a bail having a connection with the counterbalance and spaced terminal hooks that detachably engage the cross-bar of the heater.

16. In a steam-cooker, the combination with a receptacle, of a cover therefor, a heater movably mounted in the receptacle and movable in an upright direction therein, and means for attaching the cover to the heater whereby the former will be raised from the receptacle upon the upward movement of the latter.

17. In a steam-cooker, the combination with a receptacle, of a cover therefor, a heater movably mounted in the receptacle, and common means for securing the cover either to the receptacle or to the heater.

18. In a steam-cooker, the combination with a receptacle, of a cover therefor, a heater movably mounted in the receptacle, and ears hinged to the cover and arranged to be secured to the receptacle or attached to the heater.

19. In a steam-cooker, the combination with a receptacle, of a cover therefor, a heater movably mounted in the receptacle and including spaced elements movably located above the cover, and ears arranged to be secured to the receptacle and having terminal hooks adapted to be engaged with the said spaced elements.

20. In a steam-cooker, the combination with a receptacle, of a cover therefor, a heater-coil movably located in the receptacle, steam-pipes connected to the coil and slidably passing through the cover, spaced extensions connected to said pipes, a handle carried by the extensions, and ears hinged to the cover and having terminal hooks arranged to detachably engage the extensions.

In testimony that I claim the foregoing as my own I have hereto affixed my signature in the presence of two witnesses.

JOHN W. BAUMAN.

Witnesses:
CATHARINE T. BAUMAN,
LIZZIE W. BAUMAN.